(12) United States Patent
Kuroda et al.

(10) Patent No.: US 11,362,418 B2
(45) Date of Patent: Jun. 14, 2022

(54) ANTENNA MODULE

(71) Applicant: Murata Manufacturing Co., Ltd., Kyoto (JP)

(72) Inventors: Katsuhito Kuroda, Kyoto (JP); Kengo Onaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 138 days.

(21) Appl. No.: 17/005,446

(22) Filed: Aug. 28, 2020

(65) Prior Publication Data
US 2020/0395660 A1 Dec. 17, 2020

Related U.S. Application Data

(63) Continuation of application No. PCT/JP2019/007018, filed on Feb. 25, 2019.

(30) Foreign Application Priority Data

Mar. 27, 2018 (JP) .............................. JP2018-059400

(51) Int. Cl.
*H01Q 1/52* (2006.01)
*H01Q 1/22* (2006.01)
(Continued)

(52) U.S. Cl.
CPC .............. *H01Q 1/521* (2013.01); *H01Q 1/22* (2013.01); *H01Q 1/2283* (2013.01); *H01Q 1/52* (2013.01);
(Continued)

(58) Field of Classification Search
CPC .......... H01Q 1/521; H01Q 1/52; H01Q 21/06; H01Q 1/22; H01Q 1/2283; H01Q 21/065; H01Q 21/0025; H01Q 21/00
(Continued)

(56) References Cited

U.S. PATENT DOCUMENTS

2008/0074324 A1 3/2008 Puzella et al.
2009/0009399 A1* 1/2009 Gaucher ............ H01Q 21/0075
343/700 MS
(Continued)

FOREIGN PATENT DOCUMENTS

JP H03182103 A 8/1991
JP H07336116 A 12/1995
(Continued)

OTHER PUBLICATIONS

International Search Report issued in Application No. PCT/JP2019/007018, dated Mar. 26, 2019.
(Continued)

*Primary Examiner* — Hai V Tran
(74) *Attorney, Agent, or Firm* — Pearne & Gordon LLP (57) ABSTRACT

An antenna module (100) includes a dielectric substrate (125), antenna groups (123A, 123B) including a plurality of antenna elements (121), RFICs (110A, 110B) configured to supply radio-frequency power to the antenna groups (123A, 123B), a divider (140) configured to divide a radio-frequency signal between the RFICs (110A, 110B), and a ground electrode (GND2). The RFICs (110A, 110B) are mounted at a mounting surface (126) of the dielectric substrate (125). The divider (140) is provided closer to the mounting surface (126) than to the layer in which the antenna groups (123A, 123B) are provided. The divider (140) includes a first path having lower impedance and a second path having higher impedance. When viewed in plan view in a normal-line direction with respect to the mounting surface (126), a cavity (300) is formed at a portion of the ground electrode (GND2), the portion facing the second path.

20 Claims, 7 Drawing Sheets

(51) Int. Cl.
  *H01Q 21/00* (2006.01)
  *H01Q 21/06* (2006.01)

(52) U.S. Cl.
  CPC ......... *H01Q 21/00* (2013.01); *H01Q 21/0025* (2013.01); *H01Q 21/06* (2013.01); *H01Q 21/065* (2013.01)

(58) Field of Classification Search
  USPC ........................................................ 343/893
  See application file for complete search history.

(56) References Cited

U.S. PATENT DOCUMENTS

| | | | |
|---|---|---|---|
| 2015/0214598 A1* | 7/2015 | Fujita | H01Q 1/2283 343/893 |
| 2015/0229017 A1* | 8/2015 | Suzuki | H01L 23/66 29/601 |
| 2017/0229769 A1 | 8/2017 | Yokoyama et al. | |
| 2018/0159203 A1* | 6/2018 | Baks | H01Q 21/065 |
| 2019/0173167 A1* | 6/2019 | Ariumi | H01Q 3/24 |
| 2019/0207304 A1* | 7/2019 | Kim | H01L 23/5383 |
| 2019/0207323 A1* | 7/2019 | Joung | H01Q 9/0407 |
| 2019/0221937 A1* | 7/2019 | Onaka | H01Q 5/392 |
| 2019/0245275 A1 | 8/2019 | Hayashi et al. | |
| 2019/0326672 A1* | 10/2019 | Lim | H01Q 19/005 |
| 2020/0161749 A1* | 5/2020 | Onaka | H01Q 1/2283 |
| 2020/0235456 A1 | 7/2020 | Yoshioka et al. | |

FOREIGN PATENT DOCUMENTS

| | | |
|---|---|---|
| JP | H11243316 A | 9/1999 |
| JP | 2000106501 A | 4/2000 |
| JP | 2004221964 A | 8/2004 |
| JP | 2010507929 A | 3/2010 |
| WO | 2016067969 A1 | 5/2016 |
| WO | 2017208432 A1 | 12/2017 |
| WO | 2018021316 A1 | 2/2018 |

OTHER PUBLICATIONS

Written Opinion issued in Application No. PCT/JP2019/007018, dated Mar. 26, 2019.

* cited by examiner

FIG.12  0402 SIZE

FIG.13  0603 SIZE

ANTENNA MODULE

This is a continuation of International Application No. PCT/JP2019/007018 filed on Feb. 25, 2019 which claims priority from Japanese Patent Application No. 2018-059400 filed on Mar. 27, 2018. The contents of these applications are incorporated herein by reference in their entireties.

BACKGROUND OF THE DISCLOSURE

Field of the Disclosure

The present disclosure relates to an antenna module, and more particularly, to a configuration that hinders characteristic degradation of an antenna module including a plurality of antenna elements.

Description of the Related Art

In the field of wireless communication such as portable terminals, the multiple-input and multiple-output (MIMO) technology in which a plurality of antenna elements (for example, 2 to 8 antenna elements) are used at the transmit and receive sides to establish communication is known. Employing the MIMO technology has an advantage in which it is possible to improve data throughput and communication distance without enhancing communication frequency band width and transmission power.

International Publication No. 2016-067969 (Patent Document 1) discloses an antenna module formed by disposing antenna elements and a radio-frequency semiconductor device in an integrated manner at a dielectric substrate. In the antenna module disclosed in Patent Document 1, the single radio-frequency semiconductor device supplies radio-frequency power to the plurality of antenna elements, and thus, this antenna module can be used as an antenna module employing the MIMO technology described above.

Patent Document 1: International Publication No. 2016-067969

BRIEF SUMMARY OF THE DISCLOSURE

In recent years, the number of users of portable terminals such as smartphones has been increasing, and additionally, due to technological innovations such as the Internet of things (IoT), electronic devices having wireless communication functionality have also been increasing. As a result, there is a concern that the level of communication traffic in wireless networks is increased and communication speeds and communication quality are accordingly degraded.

To address such a problem, massive MIMO, which is an extension of the MIMO technology described above, has been attracting attention. Massive MIMO is a technology of assigning different radio waves to individual terminals by implementing techniques such as high-level beam forming and spatial multiplexing with the use of more antenna elements (for example, 128 antenna elements) rather than those of general MIMO, aiming to achieve high communication speeds and improve communication quality.

In the case in which wireless transmission is performed by using many antenna elements as described above, a plurality of radio-frequency semiconductor devices output radio-frequency signals to be transmitted to the plurality of antenna elements. The same reference signals are inputted to the plurality of radio-frequency semiconductor devices. Hence, in an antenna module, a divider is used to divide a reference signal among the plurality of radio-frequency semiconductor devices. Incidentally, there is a demand for further reduction in size and thickness of communication devices such as portable terminals; and accordingly, reduction in size and thickness of antenna modules is also needed.

Usually, to accomplish high efficiency and low loss, an antenna module is designed to achieve a particular impedance (for example, 50Ω or 75Ω) as the impedance of an entire signal communication path. In the case in which a divider is provided at a dielectric substrate of an antenna module for the purpose of implementing the Massive MIMO described above, when the height (thickness) of the entire antenna module is decreased, the parasitic capacitance component of the divider is increased and the desired impedance is not achieved, and as a result, it may be difficult to secure the desired communication characteristics.

The present disclosure has been made to address such problems, and an object thereof is to downsize an antenna module incorporating a divider while degradation of communication characteristics is hindered.

An antenna module according to an aspect of the present disclosure includes a dielectric substrate that has a multilayer structure, a first antenna group and a second antenna group, a first power feed circuit and a second power feed circuit, a divider, and a first ground electrode that is provided in the dielectric substrate. The first antenna group and the second antenna group each include a plurality of antenna elements provided in the dielectric substrate. The first power feed circuit and the second power feed circuit supply radio-frequency power respectively to the first antenna group and the second antenna group. The divider divides an inputted radio-frequency signal between the first power feed circuit and the second power feed circuit. The first power feed circuit and the second power feed circuit are mounted at a mounting surface of the dielectric substrate. The divider is provided in a layer closer to the mounting surface than to a layer in which the first antenna group and the second antenna group are provided in the dielectric substrate. The divider includes a first path having a first impedance and two second paths having a second impedance higher than the first impedance. When the antenna module is viewed in plan view in a normal-line direction with respect to the mounting surface of the dielectric substrate, a cavity is formed at a portion of the first ground electrode, the portion facing at least the second paths of the divider.

It is preferable that the first ground electrode be provided between the layer in which the divider is provided and the mounting surface in the dielectric substrate.

It is preferable that the antenna module further include a second ground electrode provided between the layer in which the divider is provided and the layer in which the first antenna group and the second antenna group are provided in the dielectric substrate.

It is preferable that, when the antenna module is viewed in plan view in the normal-line direction of the dielectric substrate, a cavity be formed at a portion of the second ground electrode, the portion facing at least the second paths of the divider.

It is preferable that, when the antenna module is viewed in plan view in the normal-line direction of the dielectric substrate, the cavity be formed at a position not overlapping either the first power feed circuit or the second power feed circuit.

It is preferable that the first ground electrode be provided between the layer in which the divider is provided and the layer in which the first antenna group and the second antenna group are provided in the dielectric substrate.

It is preferable that the antenna module further includes an oscillator that is provided at the mounting surface and that is configured to generate the radio-frequency signal and output the radio-frequency signal to the divider. The radio-frequency signal is a reference-frequency signal used in the first power feed circuit and the second power feed circuit.

It is preferable that the divider be a Wilkinson divider. It is preferable that the divider include a chip resistor coupled between the second paths.

It is preferable that the chip resistor be equal to or smaller than 0.4 mm×0.2 mm in size. It is preferable that the plurality of antenna elements be arranged as a two-dimensional array.

It is preferable that the antenna module further include parasitic elements that are provided to correspond individually to the plurality of antenna elements included in the first antenna group and the second antenna group.

It is preferable that, when the antenna module is viewed in plan view in the normal-line direction, the divider be provided between the first power feed circuit and the second power feed circuit.

In the antenna module according to the present disclosure, since the cavity is provided at the ground electrode, when the antenna module is viewed in plan view, the divider and the ground electrode provided in the dielectric substrate do not overlap. As a result, it is possible to reduce the parasitic capacitance between the divider, in particular, the higher impedance path of the divider, and the ground electrode; this makes it easier to achieve the desired impedance when the antenna module is reduced in thickness. Consequently, it is possible to suppress increase in reflection and loss in the path for communicating radio-frequency signals, and thus, it is possible to hinder degradation of communication characteristics and accomplish downsizing.

DETAILED DESCRIPTION OF THE DISCLOSURE

Hereinafter, an embodiment of the present disclosure is described in detail with reference to the drawings. In the drawings, identical or corresponding portions are assigned identical reference characters, and descriptions thereof are not repeated.

(Basic Configuration of Communication Apparatus)

Figure 1:
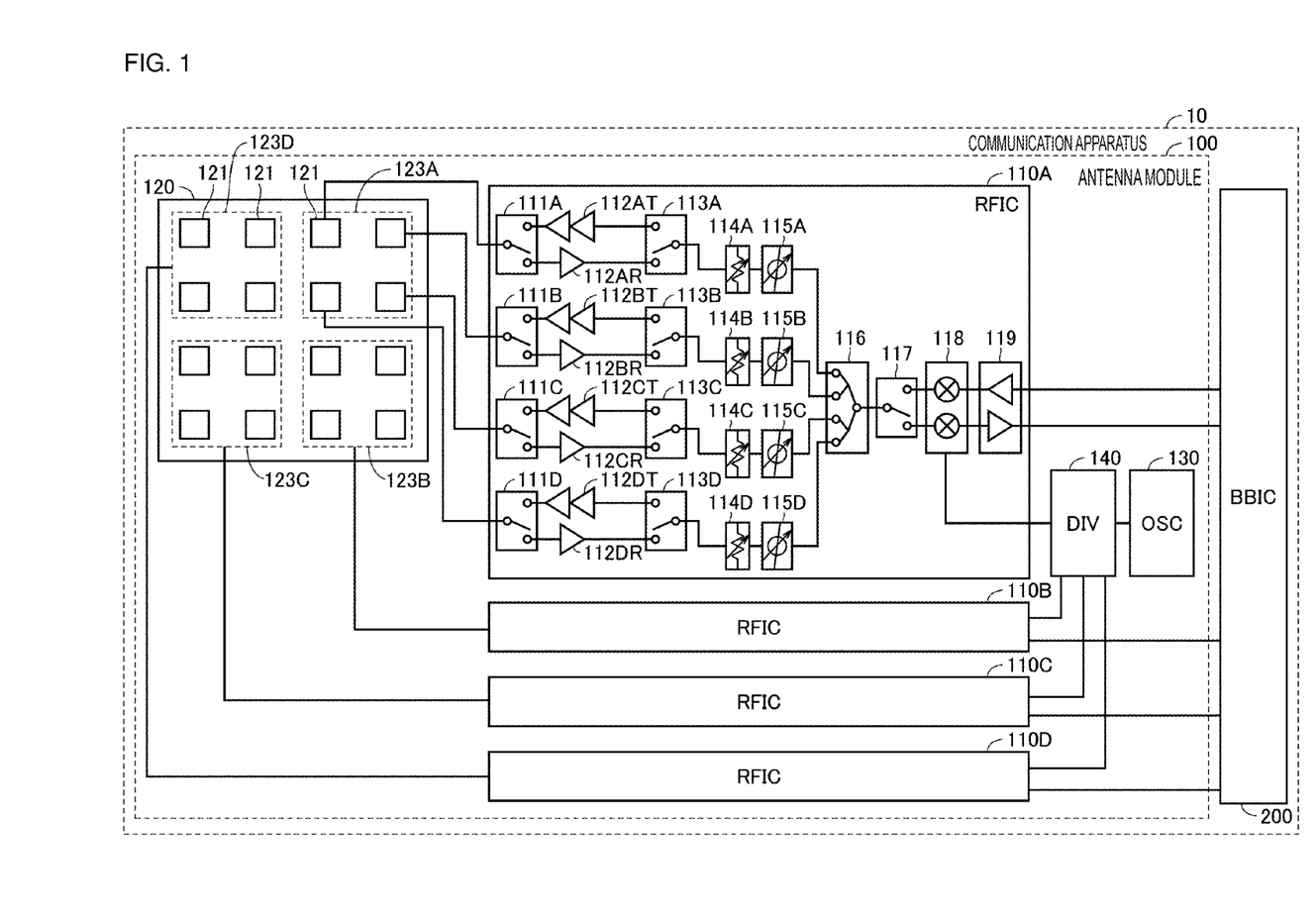
FIG. 1 is a block diagram of a communication apparatus in which an antenna module according to the present embodiment is used.

FIG. 1 is a block diagram of a communication apparatus 10 in which an antenna module 100 according to the present embodiment is used. Examples of the communication apparatus 10 include portable terminals such as a mobile phone, a smartphone, and a tablet computer, and a personal computer having communication functionality.

Referring to FIG. 1, the communication apparatus 10 includes the antenna module 100 and a BBIC 200 forming a baseband-signal processing circuit. The antenna module 100 includes a plurality of radio frequency integrated circuits (RFICs) 110A to 110D, an antenna array 120, an oscillator (OSC) 130, and a divider (DIV) 140. In the communication apparatus 10, a signal is communicated from the BBIC 200 to the antenna module 100, upconverted into a radio-frequency signal, and emitted from the antenna array 120; and a radio-frequency signal is received by the antenna array 120, downconverted, and processed by the BBIC 200.

The antenna array 120 includes a plurality of antenna elements 121. In FIG. 1, a configuration is used as an example for description in which 16 pieces of the antenna elements 121 as the plurality of antenna elements 121 are arranged as a two-dimensional 4×4 array and the RFICs 110A to 110D are provided respectively for antenna groups 123A to 123D each constituted by 4 pieces of the antenna elements 121. It should be noted that, for ease of description, FIG. 1 illustrates a detailed configuration of the RFIC 110A corresponding to the antenna group 123A but identical configurations of the RFICs 110B to 110D are omitted.

In the following description, the RFICs 110A to 110D are also collectively referred to as the "RFIC 110" and the antenna groups 123A to 123D are also collectively referred to as the "antenna group 123".

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner and splitter 116, a mixer 118, and an amplifier circuit 119.

The RFIC 110 functions as a power feed circuit that supplies radio-frequency power to the antenna elements 121. When a radio-frequency signal is transmitted, the switches 111A to 111D and 113A to 113D are switched to establish connection to the power amplifiers 112AT to 112DT and the switch 117 establishes connection to a transmit amplifier of the amplifier circuit 119. When a radio-frequency signal is received, the switches 111A to 111D and 113A to 113D are switched to establish connection to the low-noise amplifiers 112AR to 112DR and the switch 117 establishes connection to a receive amplifier of the amplifier circuit 119.

A signal communicated from the BBIC 200 is amplified by the amplifier circuit 119 and upconverted by the mixer 118. The upconverted transmit signal is split into four signals by the signal combiner and splitter 116. The four signals pass through four signal paths and separately enter the different antenna elements 121. At this time, the phase shifters 115A to 115D disposed on the signal paths are adjusted with respect to phase, so that the directivity of the antenna array 120 can be controlled.

By contrast, receive signals received by the antenna elements 121 are communicated through four different signal paths and combined together by the signal combiner and splitter 116. The combined receive signal is downconverted by the mixer 118, amplified by the amplifier circuit 119, and communicated to the BBIC 200.

The RFIC 110 is formed as, for example, a one-chip integrated-circuit component having the circuit configuration described above. Alternatively, among the devices included in the RFIC 110, the particular devices (the switches, the power amplifier, the low-noise amplifier, the attenuator, and the phase shifter) corresponding to each of the antenna elements 121 may be formed as a one-chip integrated-circuit component corresponding to each of the antenna elements 121.

The oscillator 130 is an oscillator that generates a reference-frequency signal to be used by the RFICs 110. The reference-frequency signal generated by the oscillator 130 is divided by the divider 140 and outputted to the mixers 118 of the RFICs 110. The mixer 118 generates a radio-frequency signal by mixing an intermediate-frequency signal (for example, 3.5 GHz±0.5 GHz) communicated from the BBIC 200 with a reference-frequency signal (for example, 23 to 26 GHz) from the oscillator 130. Moreover, the mixer 118 generates an intermediate-frequency signal by mixing a radio-frequency signal received by the antenna element 121 with a reference-frequency signal from the oscillator 130.

(Antenna Module Structure)

Figure 2:
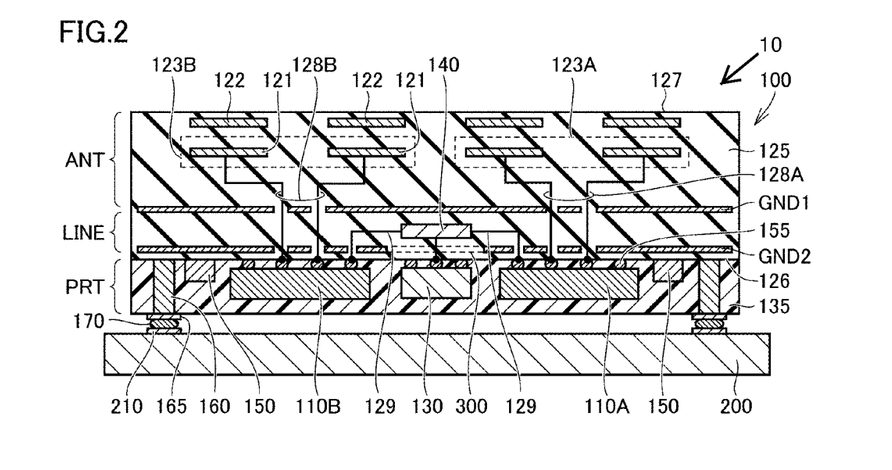
FIG. 2 is a sectional view of the antenna module in FIG. 1.

FIG. 2 is a sectional view of a state in which the antenna module 100 in FIG. 1 is mounted on the BBIC 200. Referring to FIG. 2, the antenna module 100 includes a multilayer structured dielectric substrate 125. The dielectric substrate 125 is formed of, for example, low temperature co-fired ceramics (LTCCs). The antenna module 100 is not necessarily mounted on the BBIC 200 but may be mounted on a motherboard on which the BBIC 200 is mounted.

The antenna elements 121 described in FIG. 1 are arranged in a layer of the dielectric substrate 125. FIG. 2 illustrates two antenna elements included in the antenna group 123A and two antenna elements included in the antenna group 123B.

At a mounting surface 126 of the dielectric substrate 125, electrode patterns for implementing devices and a wire pattern used for electrically coupling the electrode patterns to each other are formed, which are not illustrated in the drawing. At the mounting surface 126, the RFICs 110A and 110B, and the oscillator 130 are mounted by using solder bumps 155. Additionally, devices 150 of capacitors or inductors forming a matching circuit are also mounted on the mounting surface 126.

The devices mounted on the mounting surface 126 are molded with a resin 135. I/O through electrodes 160 for communicating signals with the BBIC 200 are formed in the resin 135. An end portion of the through electrode 160 on the mounting surface 126 side is coupled to the wire pattern formed at the mounting surface 126. Another end portion of the through electrode 160 exposed at a surface on the BBIC 200 side is coupled to a connection terminal 210 on a surface of the BBIC 200 with an electrode pattern 165 and a solder bump 170 that are interposed between the other end portion of the through electrode 160 and the connection terminal 210. Signals are communicated between the BBIC 200 and the RFICs 110 through the through electrodes 160 and the wire pattern at the mounting surface 126.

In the dielectric substrate 125, a ground electrode GND1 (a first ground electrode) is formed in a layer between the antenna elements 121 and the mounting surface 126 and a ground electrode GND2 (a second ground electrode) is also formed in a layer between the ground electrode GND1 and the mounting surface 126.

Radio-frequency signals are inputted from the RFIC 110A to the antenna elements included in the antenna group 123A through feed lines 128A. Similarly, radio-frequency signals are inputted from the RFIC 110B to the antenna elements included in the antenna group 123B through feed lines 128B. The feed lines 128A and 128B penetrate the ground electrodes GND1 and GND2 and are coupled to the antenna elements 121 included in the respective antenna groups.

Parasitic elements 122 may be provided at positions facing the respective antenna elements 121 in a layer closer to a surface 127 side relative to the layer in which the antenna elements 121 are arranged in the dielectric substrate 125.

The portion of the dielectric substrate 125 on the surface 127 side with respect to the ground electrode GND1 practically functions as an antenna in the antenna module 100 and this area is referred to as an "antenna area ANT" in this specification. Furthermore, wire patterns coupling the devices mounted at the mounting surface 126 to each other or the devices and the antenna elements to each other are formed in the area between the ground electrode GND1 and the ground electrode GND2 in the dielectric substrate 125; this area is referred to as a "line area LINE" in this specification. Further, the area molded with the resin 135 is referred to as a "parts area PRT" in this specification.

The divider 140 is positioned in the layer of the line area LINE described above. The divider 140 is coupled to the oscillator 130 mounted at the mounting surface 126 and also coupled to the RFICs 110 by using wire patterns 129 formed in the line area LINE. The divider 140 receives a reference-frequency signal from the oscillator 130 and divides the reference-frequency signal among the RFICs 110.

(Divider Configuration)

Figure 3:
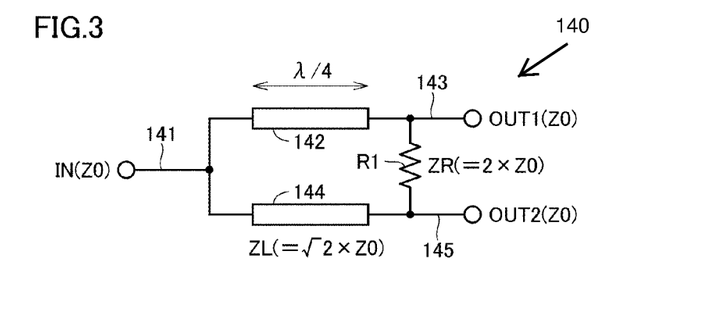
FIG. 3 is a diagram for explaining a detailed configuration of a divider illustrated in FIG. 2.

FIG. 3 is a diagram for explaining a detailed configuration of the divider 140 illustrated in FIG. 2. In the present disclosure, a Wilkinson divider is used as the divider 140. The Wilkinson divider is characterized in low loss relative to other types of dividers and also in that divided signals are equal in phase to each other.

Referring to FIG. 3, the divider 140 divides a signal inputted from an input port IN and outputs the divided signals to two output ports OUT1 and OUT2. The signal inputted from the input port IN is divided at a path 141 with an impedance Z0. One of the divided signals is communicated through a path 142 with an impedance ZL higher than Z0 and a path 143 with the impedance Z0 and outputted from the output port OUT1. The other signal is communicated through a path 144 with the same impedance ZL and a path 145 with the impedance Z0 and outputted from the output port OUT2. The paths 141, 143, and 145 with lower impedance correspond to a "first path" in the present disclosure. The paths 142 and 144 with higher impedance correspond to "second paths" in the present disclosure.

The impedance ZL of the paths 142 and 144 with higher impedance is set at a √2 multiple of the impedance of the paths 141, 143, and 145 with lower impedance (ZL=√2×Z0). The paths 142 and 144 with higher impedance are designed to have a λ/4 path length when the wave length of a representative communicating radio-frequency signal is λ.

Furthermore, to achieve isolation between two divided outputs, a resistor R1 with an impedance ZR is coupled between the paths 143 and 145. The impedance of the resistor R1 is set at a 2 multiple of the impedance of the paths 141, 143, and 145 with lower impedance (ZR=2×Z0).

For example, when the communication path is designed to have a 50Ω impedance, which means that Z0=50Ω, the paths 142 and 144 with higher impedance are set at approximately 71Ω (ZL=71Ω) and the impedance of the resistor R1 is set at 100Ω (ZR=100Ω).

The antenna module 100 as illustrated in FIG. 2 may be in some cases used for portable terminals such as smartphones. Concerning such portable terminals, there is a demand for reduction in size and thickness. As for the antenna module 100 illustrated in FIG. 2, the thickness of the antenna area ANT is determined in accordance with specifications such as the frequency band of radio-frequency signal used for communication; for this reason, to achieve more reduction in thickness, it is necessary to reduce the thickness of the line area LINE or the thickness of the parts area PRT.

However, if the line area LINE is thinned, the distance between the divider 140 and the ground electrodes GND1 and GND2 disposed in the line area LINE is shortened. As a result, the parasitic capacitance between the divider 140 and the ground electrodes GND1 and GND2 is increased and it is impossible to achieve sufficient impedances of the paths (in particular, the paths 142 and 144 with higher impedance) of the divider 140, and consequently, loss may be increased due to signal reflection, and communication characteristics may be degraded.

In consideration of this problem, in the present embodiment, a cavity is formed at either the ground electrode GND1 or GND2 included in the line area LINE; the cavity is positioned at a portion overlapping at least the paths 142 and 144 with higher impedance of the divider 140 as the antenna module 100 is viewed in plan view in a normal-line direction with respect to the mounting surface 126. FIG. 2 illustrates an example in which a cavity 300 is formed at the ground electrode GND2 on the mounting surface 126 side, but a cavity may be formed at the ground electrode GND1 instead. However, the ground electrode GND1 functions as a reference potential of the antenna area ANT and also functions as a shield for blocking noise signals emitted from the line area LINE and the parts area PRT. Hence, it is preferable that a cavity be formed not at the ground electrode GND1 but at the ground electrode GND2.

Furthermore, the cavity may be formed at not only the portion overlapping the paths 142 and 144 with higher impedance of the divider 140 but also a portion of the ground electrode overlapping a portion excluding the paths 142 and 144 in the divider 140.

Such a configuration reduces the parasitic capacitance between the divider 140 and the ground electrode GND1 or GND2, and thus, it is possible to more easily achieve impedances of the paths of the divider 140. As a result, both the ports, which are the input port and the output port, are improved with respect to the reflection characteristic and it is possible to suppress reduction in loss.

(Layer Arrangement of Antenna Module)

Next, referring to FIGS. 4 to 7 and 8 to 11, an example of arrangement of devices in layers of the antenna module according to the present embodiment is described. FIGS. 4 to 7 indicate an example of the antenna module in which 8 pieces of the antenna elements 121 are arranged as a two-dimensional 2×4 array. FIGS. 8 to 11 illustrate an example of the antenna module in which 16 pieces of the antenna elements 121 are arranged as a two-dimensional 4×4 array.

Figure 4:
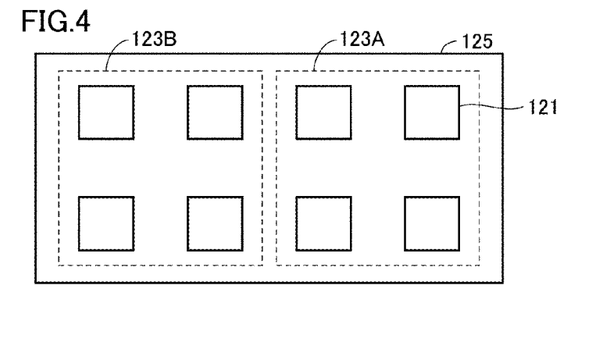
FIG. 4 is a plan view of a layer including antenna elements in an example of the antenna module using 2×4 pieces of antenna elements.
Figure 5:
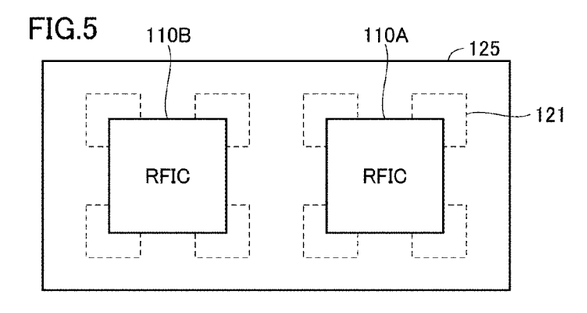
FIG. 5 is a plan view of a layer including RFICs in the antenna module in FIG. 4 when viewed from a BBIC.
Figure 6:
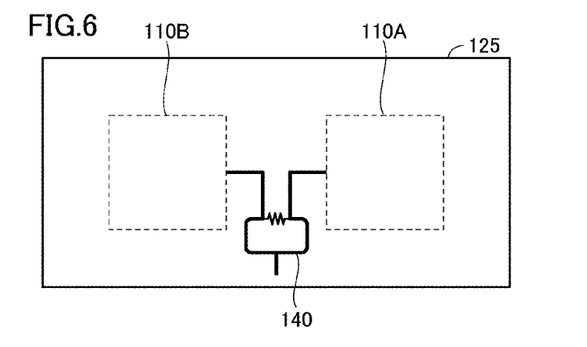
FIG. 6 is a plan view of a layer including a divider in the antenna module in FIG. 4.
Figure 7:
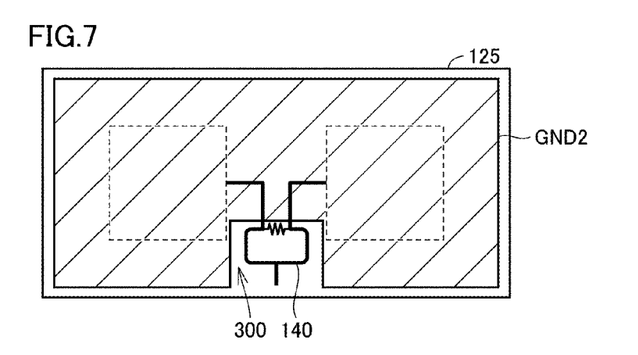
FIG. 7 is a plan view of a layer including a second ground electrode in the antenna module in FIG. 4 when viewed from the BBIC.
Figure 8:
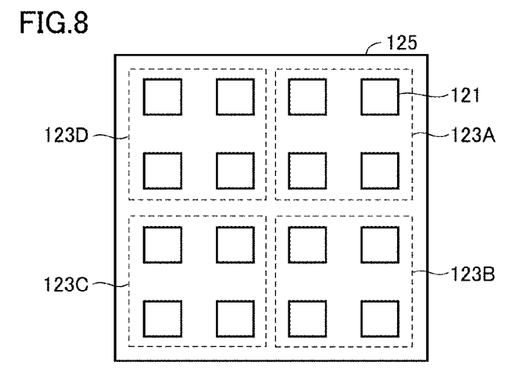
FIG. 8 is a plan view of a layer including antenna elements in an example of the antenna module using 4×4 pieces of antenna elements.
Figure 9:
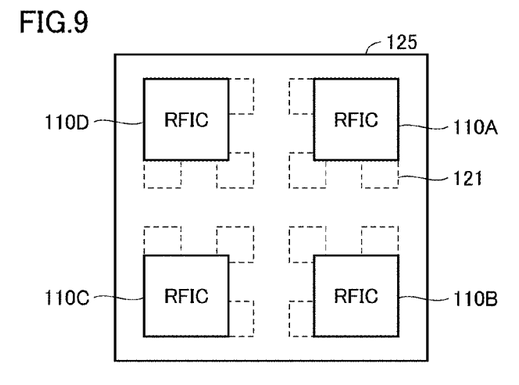
FIG. 9 is a plan view of a layer including RFICs in the antenna module in FIG. 8 when viewed from a BBIC.
Figure 10:
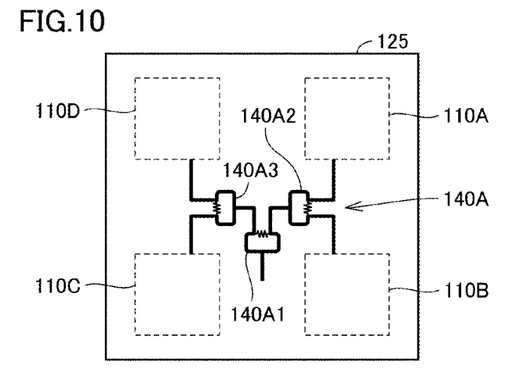
FIG. 10 is a plan view of a layer including a divider in the antenna module in FIG. 8.
Figure 11:
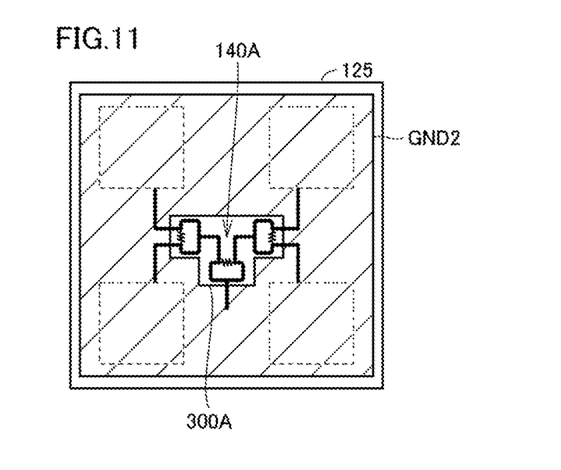
FIG. 11 is a plan view of a layer including a second ground electrode in the antenna module in FIG. 8 when viewed from the BBIC.

FIGS. 4 and 8 each provide a plan view of the layer containing the antenna elements 121. FIGS. 5 and 9 each provide a plan view of the layer containing the RFICs 110 as viewed from the BBIC 200 side. FIGS. 6 and 10 each provide a plan view of the layer containing the divider 140 (140A). FIGS. 7 and 11 each provide a plan view of the layer containing the ground electrode GND2 as viewed from the BBIC 200 side.

Referring to FIG. 4, 8 pieces of the antenna elements 121 are arranged as a two-dimensional 2×4 array, in which 2×2 pieces of the antenna elements on one side are grouped as the antenna group 123A and 2×2 pieces of the antenna elements on the other side are grouped as the antenna group 123B.

As illustrated in FIG. 5, the RFIC 110A is positioned to correspond to the antenna group 123A and the RFIC 110B is positioned to correspond to the antenna group 123B. In FIG. 5, when the antenna module 100 is viewed in plan view, each RFIC is positioned such that the center of the arrangement of 4 pieces of the antenna elements 121 contained in a corresponding antenna group coincides with the diagonal center of the RFIC.

As illustrated in FIG. 6, when the antenna module 100 is viewed in plan view, the divider 140 is formed at a position not overlapping the two RFICs 110A and 110B. Furthermore, the divider 140 is positioned between the RFICs 110A and 110B and spaced apart by short and equal distances from the two RFICs 110A and 110B. Since the divider 140 is provided at such a position, the divider 140 can provide the two RFICs 110A and 110B with radio-frequency signals in phase and with a low loss. As a result, it is possible to implement a high-gain antenna module with excellent directivity control performance.

As illustrated in FIG. 7, at the ground electrode GND2, the cavity 300 is formed at a position overlapping at least the higher impedance paths in the divider 140 when the antenna module 100 is viewed in plan view. To hinder interference of electromagnetic-field between the RFICs 110 and the divider 140, it is preferable that the cavity 300 is formed not to overlap the two RFICs 110A and 110B.

Next, the example in which 4×4 pieces of the antenna elements 121 are arranged as a two-dimensional array is described. Referring to FIG. 8, 16 pieces of the antenna elements 121 are grouped into the four antenna groups 123A, 123B, 123C, and 123D each containing 2×2 pieces of the antenna elements 121. The RFIC 110A is positioned to correspond to the antenna group 123A, the RFIC 110B is positioned to correspond to the antenna group 123B, the RFIC 110C is positioned to correspond to the antenna group 123C, and the RFIC 110D is positioned to correspond to the antenna group 123D (FIG. 9).

To divide a signal and output divided signals to four antenna groups by using the Wilkinson divider illustrated in FIG. 3, three dividers are necessary as illustrated as the divider 140A in FIG. 10. More specifically, a radio-frequency signal outputted from the oscillator 130 is firstly divided by a divider 140A1 into two. Subsequently, one output is inputted to a divider 140A2 and the other output is inputted to a divider 140A3. Signals divided by the divider 140A2 are provided for the RFICs 110A and 110B. Signals divided by the divider 140A3 are provided for the RFICs 110C and 110D.

As illustrated in FIG. 10, when the antenna module 100 is viewed in plan view, the divider 140A consisting of three dividers is provided at a position not overlapping any of the RFICs 110A to 110D in which the interconnection lengths are equal to each other. When the antenna module 100 is viewed in plan view, at the ground electrode GND2, a cavity 300A is formed at a position overlapping at least the higher impedance paths in the divider 140A (FIG. 11).

In the above description, an example of a single-polarized antenna module in which a single radio-frequency signal is provided by an RFIC for antenna elements is explained, but the structure described above can be applied to a dual-polarized antenna module in which two different radio-frequency signals are provided for antenna elements.

(Resistor in Divider)

As described with reference to FIG. 3, in a Wilkinson divider, a resistor is coupled between two output ports for the purpose of achieving isolation between the output ports. As the resistor, a commercially available chip resistor capable of being mounted on a substrate surface can be used.

However, in the case in which a chip resistor is used as a Wilkinson divider, when the chip resistor can achieve a desired resistance value, the size of the chip resistor affects characteristics of the divider. Specifically, as the chip size increases, the width or length of a conductive member inside the chip increases in comparison to a smaller chip size with the same nominal resistance; as a result, parasitic capacitance and/or parasitic inductance of the resistor increases. If a designed resistance value is achieved, this parasitic component still changes the impedance of paths and characteristics of the divider are accordingly degraded; this affects the frequency characteristic of the antenna module.

Hence, when a Wilkinson divider is used as the divider of the antenna module of the present embodiment, it is preferable that the chip size of a chip resistor used is as small as possible.

Hereinafter, with reference to FIGS. 12 to 15B, simulation results about divider characteristics in the case of using chip resistors of different sizes are described. The simulation was conducted by using a rectangular chip resistor of the "0402" chip size and a rectangular chip resistor of the "0603" size as the chip resistors. The chip size "0402" indicates a rectangular chip resistor of 0.4 mm in length and 0.2 mm in width (0.4 mm×0.2 mm) and the chip size "0603" indicates a rectangular chip resistor of 0.6 mm in length and 0.3 mm in width (0.6 mm×0.3 mm).

Figure 12:
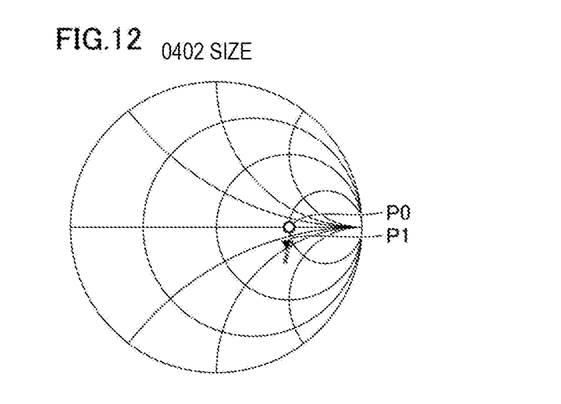
FIG. 12 is an example of a Smith chart in the case in which a chip resistor of a 0402 size is used as a resistor of a Wilkinson divider.
Figure 13:
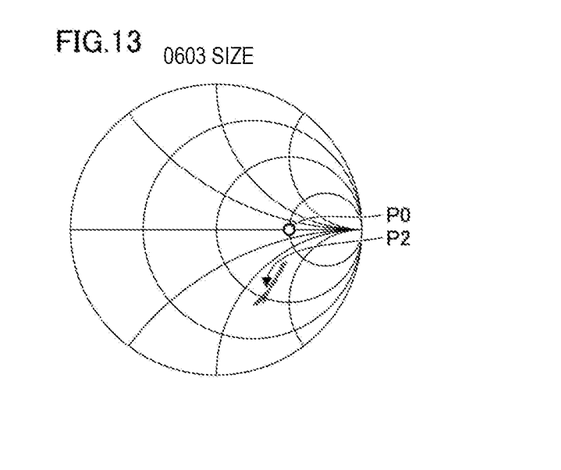
FIG. 13 is an example of a Smith chart in the case in which a chip resistor of a 0603 size is used as a resistor of a Wilkinson divider.

FIG. 12 provides an example of a Smith chart in the case of the chip resistor of the "0402" size. FIG. 13 provides an example of a Smith chart in the case of the chip resistor of the "0603" size. In FIGS. 12 and 13, P0 indicates a position of a target impedance (50Ω), P1 indicates the impedance of the "0402" size, and P2 indicates the impedance of the "0603" size.

As seen from FIGS. 12 and 13, in the Smith charts, the chip resistor of the smaller chip size "0402" is closer to the target impedance than the chip resistor of the "0603" size.

Figure 14A:
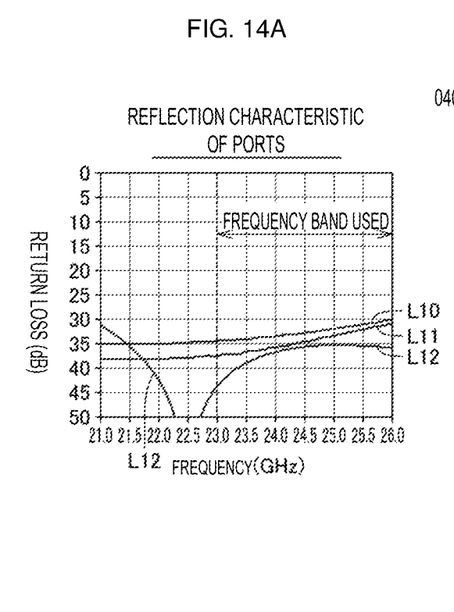
FIGS. 14A and 14B illustrate characteristics of the Wilkinson divider in the case in which the chip resistor of the 0402 size is used.
Figure 14B:
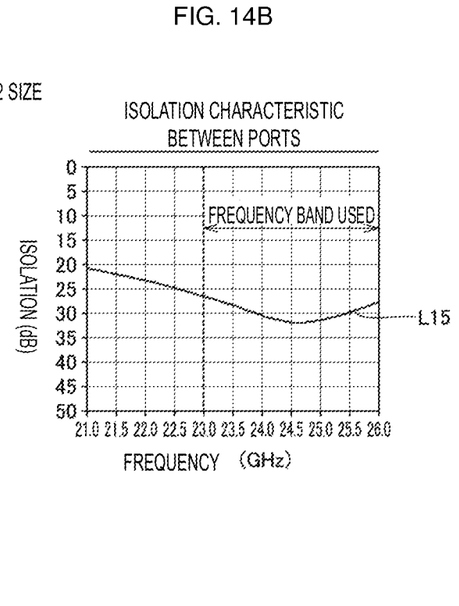
Figure 15A:
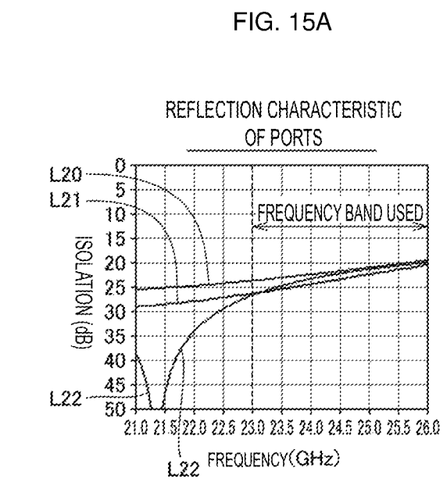
FIGS. 15A and 15B illustrate characteristics of the Wilkinson divider in the case in which the chip resistor of the 0603 size is used.
Figure 15B:
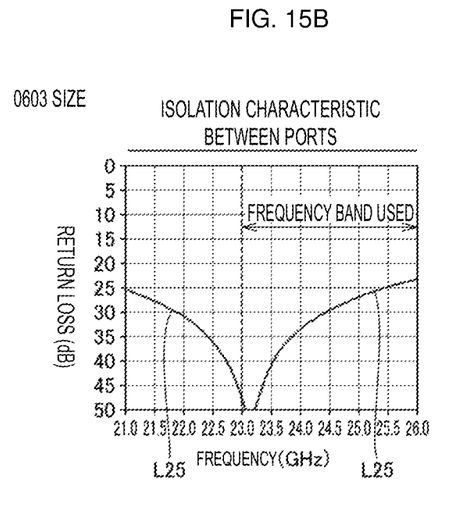

FIGS. 14A and 14B indicate simulation results regarding the reflection characteristic (FIG. 14A) with respect to individual ports and the isolation characteristic (FIG. 14B) between output ports in the case of the chip resistor of the "0402" size. FIGS. 15A and 15B indicate simulation results regarding the reflection characteristic (FIG. 15A) with respect to individual ports and the isolation characteristic (FIG. 15B) between output ports in the case of the chip resistor of the "0603" size.

Since an example of the antenna module indicated by the present embodiment targets radio-frequency signals in the millimeter-wave band, evaluation is carried out by using a frequency band of 23 to 26 GHz.

Referring to FIGS. 14A and 14B, in FIG. 14A, a line L10 indicates the reflection characteristic of the output port OUT1, a line L11 indicates the reflection characteristic of the output port OUT2, and a line L12 indicates the reflection characteristic of the input port IN. As understood from FIG. 14A, every port achieves a return loss of 30 dB or higher in the 23 to 26 GHz band. This means that every port achieves a favorable reflection characteristic of relatively little reflection in the frequency band used. In FIG. 14B, the isolation (a line L15) between the output ports achieves 25 dB or higher in the 23 to 26 GHz band. This means that, in the frequency band used, a favorable isolation characteristic of relatively little leakage of radio-frequency signal between the output ports is achieved.

In FIG. 15A, lines L20, L21, and L22 respectively indicate the reflection characteristic of the output port OUT1, the reflection characteristic of the output port OUT2, and the reflection characteristic of the input port. Every port achieves the return loss of a value lower than 30 dB in the 23 to 26 GHz band. This means that, in the case of the chip resistor of the "0603" size, the reflection characteristic in the frequency band used is degraded in comparison to the case of the chip resistor of the "0402" size. Moreover, the isolation between the output ports (a line L25) illustrated in FIG. 15B achieves 25 dB or higher in the band of 23 to about 25.4 GHz but falls below 25 dB in the band of 25.4 to 26 GHz, which means that the isolation characteristic is degraded.

As described above, regardless of the same nominal resistance, the size of a chip resistor used can affect the frequency characteristic of a Wilkinson divider. According to the simulation results described above, when a chip resistor is used as an isolation resistor of a Wilkinson divider, it is preferable that the size of a resistor used is equal to or smaller than the "0402" size.

The embodiment disclosed herein should be considered as an example in all respects and not construed in a limiting sense. The scope of the present disclosure is indicated by not the above description of the embodiment but the claims and all changes which come within the meaning and range of equivalency of the claims are therefore intended to be embraced therein.

10 communication apparatus, 126 mounting surface, 100 antenna module, 111A-111D, 113A-113D, 117 switch, 112AR-112DR low-noise amplifier, 112AT-112DT power amplifier, 114A-114D attenuator, 115A-115D phase shifter, 116 signal combiner and splitter, 118 mixer, 119 amplifier circuit, 120 antenna array, 121 antenna element, 122 parasitic element, 123, 123A-123D antenna group, 125 dielectric substrate, 127 surface, 128 feed line, 129 wire pattern, 130 oscillator, 135 resin, 140, 140A, 140A1-140A3 divider, 141-145 path, 150 device, 155, 170 solder bump, 160 through electrode, 165 electrode pattern, 210 connection terminal, 300, 300A cavity, ANT antenna area, GND1, GND2 ground electrode, IN input port, OUT1, OUT2 output port, PRT parts area, R1 resistor.

The invention claimed is:
1. An antenna module comprising:
a dielectric substrate that has a multilayer structure;

a first antenna group and a second antenna group that are provided in the dielectric substrate and that each include a plurality of antenna elements;

a first power feed circuit and a second power feed circuit each configured to supply radio-frequency power respectively to the first antenna group and the second antenna group;

a divider configured to divide an inputted radio-frequency signal between the first power feed circuit and the second power feed circuit; and a first ground electrode that is provided in the dielectric substrate, wherein the first power feed circuit and the second power feed circuit are mounted at a mounting surface of the dielectric substrate, the divider is provided in a first layer closer to the mounting surface than to a second layer in which the first antenna group and the second antenna group are provided in the dielectric substrate, the divider includes a first path having a first impedance and two second paths having a second impedance higher than the first impedance, and when the antenna module is viewed in plan view in a normal-line direction with respect to the mounting surface of the dielectric substrate, a cavity is formed at a portion of the first ground electrode, the portion facing at least the second paths of the divider.

2. The antenna module according to claim 1, wherein the first ground electrode is provided between the second layer and the mounting surface in the dielectric substrate.

3. The antenna module according to claim 2, further comprising:
a second ground electrode that is provided between the first layer and the second layer.

4. The antenna module according to claim 3, wherein when the antenna module is viewed in plan view in the normal-line direction, a cavity is formed at a portion of the second ground electrode, the portion facing at least the second paths of the divider.

5. The antenna module according to claim 2, further comprising:
a second ground electrode that is provided between the first ground electrode and the mounting surface.

6. The antenna module according to claim 2, wherein when the antenna module is viewed in plan view in the normal-line direction, the cavity is formed at a position not overlapping either the first power feed circuit or the second power feed circuit.

7. The antenna module according to claim 2, further comprising:
an oscillator that is provided at the mounting surface and that is configured to generate the radio-frequency signal and output the radio-frequency signal to the divider, wherein the radio-frequency signal is a reference-frequency signal used in the first power feed circuit and the second power feed circuit.

8. The antenna module according to claim 2, wherein the divider is a Wilkinson divider.

9. The antenna module according to claim 2, wherein the plurality of antenna elements are arranged as a two-dimensional array.

10. The antenna module according to claim 1, wherein when the antenna module is viewed in plan view in the normal-line direction, the cavity is formed at a position not overlapping either the first power feed circuit or the second power feed circuit.

11. The antenna module according to claim 1, wherein the first ground electrode is provided between the first layer and the second layer.

12. The antenna module according to claim 1, further comprising:
an oscillator that is provided at the mounting surface and that is configured to generate the radio-frequency signal and output the radio-frequency signal to the divider, wherein the radio-frequency signal is a reference-frequency signal used in the first power feed circuit and the second power feed circuit.

13. The antenna module according to claim 1, wherein the divider is a Wilkinson divider.

14. The antenna module according to claim 13, wherein the divider includes a chip resistor coupled between the second paths.

15. The antenna module according to claim 14, wherein the chip resistor is equal to or smaller than 0.4 mm×0.2 mm in size.

16. The antenna module according to claim 15, wherein the parasitic elements are provided in a third layer closer to the second layer than to the first layer.

17. The antenna module according to claim 1, wherein the plurality of antenna elements are arranged as a two-dimensional array.

18. The antenna module according to claim 1, further comprising:
parasitic elements that are provided to correspond individually to the plurality of antenna elements included in the first antenna group and the second antenna group.

19. The antenna module according to claim 1, further comprising:
parasitic elements each being provided at a position facing a respective antenna element of the plurality of antenna elements included in the first antenna group and the second antenna group.

20. The antenna module according to claim 1, wherein when the antenna module is viewed in plan view in the normal-line direction, the divider is provided between the first power feed circuit and the second power feed circuit.

* * * * *